United States Patent [19]

Koudijs

[11] Patent Number: 5,503,221

[45] Date of Patent: Apr. 2, 1996

[54] DISCHARGE SYSTEM FOR COMBUSTION GASES

[76] Inventor: Philip R. Koudijs, Aan de Beuk 20,, 6391 Al Landgraaf, Netherlands

[21] Appl. No.: 391,639

[22] Filed: Feb. 21, 1995

Related U.S. Application Data

[63] Continuation of Ser. No. 217,771, Mar. 24, 1994, abandoned, which is a continuation of Ser. No. 965,349, Oct. 23, 1992, abandoned.

[30] Foreign Application Priority Data

Oct. 24, 1991 [NL] Netherlands .............. 9101782

[51] Int. Cl.$^6$ .............................. F16K 1/16; F28F 27/02
[52] U.S. Cl. .................... 165/100; 165/103; 60/39.33; 137/875
[58] Field of Search ............... 60/39.31, 39.32, 60/39.33, 39.5, 39.511, 39.182, 226.2, 230, 232; 165/100, 103; 239/265.29, 553.5; 137/875; 244/100 B

[56] References Cited

U.S. PATENT DOCUMENTS

| | | | |
|---|---|---|---|
| 2,227,666 | 1/1941 | Noack .................................. | 60/39.511 |
| 2,713,245 | 7/1955 | Weaving ............................... | 60/39.511 |
| 2,945,346 | 7/1960 | Arnzen ................................. | 239/265.29 |
| 3,220,775 | 9/1969 | Alderson . | |
| 3,805,884 | 4/1974 | Burt et al. . | |
| 3,837,411 | 9/1974 | Nash et al. ........................... | 60/230 |
| 4,753,392 | 6/1988 | Thayer et al. ........................ | 60/230 |
| 4,760,960 | 8/1988 | Ward et al. ........................... | 60/230 |
| 4,821,507 | 4/1989 | Bachmann et al. . | |
| 5,002,121 | 3/1991 | von Erichsen ........................ | 137/875 |
| 5,120,021 | 6/1992 | Squirrell et al. . | |
| 5,186,205 | 2/1993 | Bachmann . | |

FOREIGN PATENT DOCUMENTS

| | | |
|---|---|---|
| 0087643 | 9/1983 | European Pat. Off. . |
| 9205380 | 4/1992 | European Pat. Off. . |
| 1035977 | 8/1958 | Germany . |
| 901538 | 7/1962 | United Kingdom ................... 137/875 |

*Primary Examiner*—Richard A. Bertsch
*Assistant Examiner*—William Wicker
*Attorney, Agent, or Firm*—Harness, Dickey & Pierce

[57] ABSTRACT

The invention relates to a discharge system for combustion gases of a gas turbine or the like, whereby one end of the discharge pipe is connected to the gas turbine or the like, whilst the other end of the discharge pipe is connected to a heat exchanger. A branch pipe, which extends transversely to the discharge pipe, is connected to said discharge pipe. A valve mechanism is disposed near the connection of the branch pipe to the discharge pipe, which valve mechanism is pivotable between a first position, in which the end of the branch pipe connecting to the discharge pipe is closed, and a second position, in which the discharge pipe is closed downstream of the connection of the branch pipe to the discharge pipe. At least one curved guide vane is provided, which, in the second position of the valve, is located upstream of the valve mechanism, at least partially within the discharge pipe, and which extends downstream from its upstream edge, in the direction of the branch pipe. The guide vane is adjustable up to a position in the branch pipe, so as to be able to adjust the valve mechanism from the second position into the first position.

19 Claims, 1 Drawing Sheet

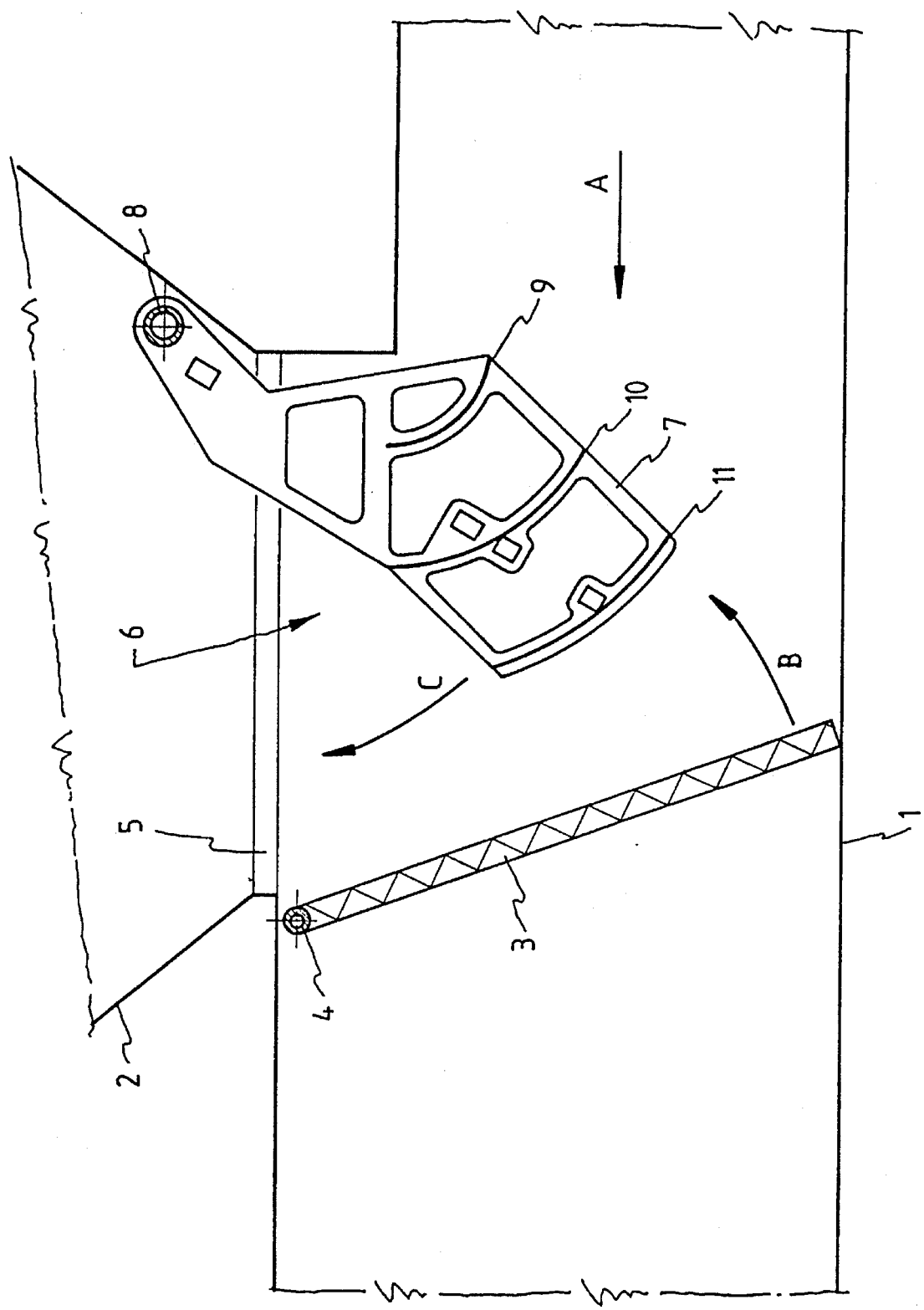

DISCHARGE SYSTEM FOR COMBUSTION GASES

This is a continuation of U.S. patent application Ser. No. 08/217,771, now abandoned, filed Mar. 24, 1994, which is a continuation of 07/965,349 filed Oct. 23, 1992 now abandoned.

The invention relates to a discharge system for combustion gases of a gas turbine or the like, whereby one end of the discharge pipe is connected to the gas turbine or the like, whilst the other end of the discharge pipe is connected to a heat exchanger or the like, and a branch pipe, which extends transversely to the discharge pipe, is connected to said discharge pipe, a valve being disposed near the connection of the branch pipe to the discharge pipe, said valve being pivotable about a pivot pin located downstream of the branch pipe, between a first position, in which the valve closes the end of the branch pipe connecting to the discharge pipe, and a second position, in which the valve closes the discharge pipe downstream of the connection of the branch pipe to the discharge pipe, whilst at least one curved guide vane is provided, which, in the second position of the valve, is located upstream of the valve, at least partially within the discharge pipe, and which extends downstream from its upstream edge, in the direction of the branch pipe, and whereby the guide vane is adjustable up to a position in the branch pipe.

Such a discharge system has been described in older patent application Ser. No. WO 92/05380 published after the priority date of the present application. With this prior discharge system a plurality of guide vanes are attached to the valve by means of carriers projecting from said valve. The carriers with the guide vanes supported by the carriers constitute a heavy load on the valve, which, also in view of the high temperatures to which the valve is exposed during operation, may easily lead to undesirable deformations of the valve, which may cause seizure of the valve and/or result in an unsatisfactory closing performance of the valve in the various positions.

Furthermore, with this known construction the guide vanes get into such a disadvantageous position with respect to the gas flow upon adjusting of the valve, that very large forces are required to adjust the valve.

According to the invention the guide vane is pivotable about a further pivot pin located within the branch pipe.

By using the construction according to the invention the guide vane(s) can be supported and adjusted independently of the valve, and no undesirable forces will be exerted on the valve by the guide vane.

Because of the possibility to adjust the guide vane independently of the valve, it will furthermore suffice to provide comparatively light drive means for adjusting the various parts.

A further advantage of the construction according to the invention is that the valve can be opened partially, whilst the guide vane(s) will remain in the position suitable for deflecting the combustion gases into the branch pipe. The gas passed by the partially opened valve may thereby be used to heat the heat exchanger or the like, prior to supplying all combustion gases from the gas turbine to the heat exchanger, whilst the remainder of the combustion gases is still effectively deflected in the direction of the branch pipe by the guide vane(s).

It is noted that from U.S. Pat. No. 3,270,775 a valve mechanism is known provided with a pair of fixedly interconnected valve bodies. The one valve body closes a discharge pipe in a first position of the valve mechanism, whilst the other curved valve body functions as a guide vane for deflecting the flow from the discharge pipe into a branch pipe connected to said discharge pipe. In a second position of the valve mechanism the curved valve body closes the branch pipe, whilst the first valve body is disposed approximately centrally in the discharge pipe, parallel to the longitudinal axis of the discharge pipe, thereby constituting an undesirable impediment for the flow of combustion gas through the discharge pipe.

The invention will be explained in more detail hereafter with reference to an embodiment of the construction according to the invention diagrammatically shown in the accompanying figure.

BRIEF DESCRIPTION OF THE DRAWINGS

The accompanying FIGURE shows a vertical cross section through an embodiment of the invention.

The discharge system shown in the FIGURE comprises a discharge pipe 1 and a branch pipe 2 extending transversely thereto. In the FIGURE the upstream part of the discharge pipe 1, which is located on the right in said FIGURE, will be in communication with a gas turbine or the like, whilst the downstream part of the discharge pipe 1, located on the left in the FIGURE, will be connected to a heat exchanger or the like. From said gas turbine or the like the combustion gases flow through the discharge pipe 1 in the direction indicated by the arrow A, towards the point where the branch pipe 2 is connected to the discharge pipe 1.

A valve 3 is disposed in the discharge pipe 1, said valve being pivotable about a pivot pin 4 perpendicularly crossing the longitudinal axis of the discharge pipe 1. As will be apparent from the FIGURE, the pivot pin 4 is arranged near an opening 5 provided in a wall of the discharge pipe 1, to which opening the branch pipe 2 is connected, the pivot pin 4 being located downstream of said opening.

In the position shown in the FIGURE the valve 3 closes the discharge pipe 1 downstream of the opening 5, so that in this position combustion gases flowing in the direction indicated by the arrow A will be forced to flow through opening 5 and into the branch pipe 2, which opening may for example be connected to a chimney or the like, as explained above.

From the position shown in the FIGURE the valve 3 may be pivoted, in the direction according to arrow B, into a horizontal position, in which the valve 3 closes the opening 5. In this position of the valve 3 the gases flowing in the direction indicated by the arrow A will be discharged, via the discharge pipe 1, to a heat exchanger or the like.

According to the invention the discharge system is provided with a deflection mechanism 6 for the combustion gases. This deflection mechanism 6 is provided with two carrier arms 7 located near sides of the discharge channel 1 and in the interior of the discharge channel 1, when seen in the FIGURE, said carrier arms being secured to a shaft 8 extending parallel to the pivot pin 4 and being located within the branch pipe 2. A few curved guide vanes, three (9, 10, 11) in the illustrated embodiment, are provided between the arms 7, said guide vanes extending into the channel 1 along at least substantially the entire width of said discharge channel, perpendicularly to the plane of the drawing, when seen in the FIGURE. In the position illustrated in the FIGURE the curved vanes thereby extend downstream from their upstream edges, sloping upwards in the direction of the branch pipe. It will be apparent that the vanes thereby effect that a large part of the combustion gases flowing towards the vanes in the direction according to the arrow A are gradually deflected in the direction of the branch channel, whilst the remaining combustion gases collide with the valve 3, upon which they are deflected by the valve 3, likewise in the direction of the branch pipe. It is advantageous thereby that also the valve 3 slopes upwards, as shown.

The deflection system comprising the arms 7 and the vanes 9–11 can be pivoted about the central axis of the shaft 8, in the direction according to the arrow C, from the position illustrated in the FIGURE into a position, in which the entire deflection mechanism is located within the branch pipe. When the deflection mechanism has been pivoted into this position located within the branch pipe, the valve 3 may be pivoted upwards in the direction indicated by the arrow B, so as to close the opening 5, so that the combustion gases are then discharged through the discharge pipe in the direction of the heat exchanger or the like, without any element impeding the flow being present in the discharge pipe.

Of course variations and/or additions to the construction described above and illustrated in the FIGURE are conceivable within the spirit and scope of the invention.

Thus the shaft 8 may for example also be arranged near the opening 5.

The number of guide vanes may be varied, dependent on the conditions of operation.

In the position closing the discharge pipe the valve 3 is generally disposed slightly obliquely, as shown, but also a vertical position, perpendicularly to the longitudinal axis of the discharge pipe, is conceivable.

I claim:

1. A discharge system for combustion gases of a gas turbine comprising:
   a discharge pipe wherein one end is connected to the gas turbine, the other end of the discharge pipe is connected to a heat exchanger;
   a branch pipe, which extends transversely to the discharge pipe, is connected to said discharge pipe;
   a valve being disposed near the connection of the branch pipe to the discharge pipe, said valve being pivotable about a pivot pin located downstream of the branch pipe, between a first position, in which the valve closes the end of the branch pipe connecting to the discharge pipe, and a second position, in which the valve closes the discharge pipe downstream of the connection of the branch pipe to the discharge pipe;
   at least one curved guide vane, which, in the second position of the valve, is located upstream of the valve, at least partially within the discharge pipe, and which extends downstream from its upstream edge, in the direction of the branch pipe, and whereby the guide vane is adjustable to a position in the branch pipe, characterized in that said guide vane is pivotable about a further pivot pin located within the branch pipe.

2. A discharge system according to claim 1, characterized in that in said second position the valve is angularly disposed relative to the longitudinal axis of said discharge pipe to aid in the diverting of said combustion gases towards said branch pipe.

3. A discharge system according claim 1, characterized in that said further pivot pin is located near the upstream side of the branch pipe, when seen in the direction of flow through the discharge pipe.

4. A discharge system according to claim 3, characterized in that in said second position the valve is angularly disposed relative to the longitudinal axis of said discharge pipe to aid in the diverting of said combustion gases towards said branch pipe.

5. A discharge system according to claim 1, characterized in that said vanes extend between arms, which are pivotable about said further pivot pin.

6. A discharge system according to claim 5, characterized in that said further pivot pin is located near the upstream side of the branch pipe, when seen in the direction of flow through the discharge pipe.

7. A discharge system according to claim 3, characterized in that in said second position the valve is angularly disposed relative to the longitudinal axis of said discharge pipe to aid in the diverting of said combustion gases towards said branch pipe.

8. A discharge system according to claim 1, characterized in that one or more guide vanes are provided in spaced-apart, substantially parallel relationship.

9. A discharge system according to claim 8, characterized in that said vanes extend between arms, which are pivotable about said further pivot pin.

10. A discharge system according to claim 8, characterized in that said further pivot pin is located near the upstream side of the branch pipe, when seen in the direction of flow through the discharge pipe.

11. A discharge system according to claim 8, characterized in that in said second position the valve slopes upwards from the side of the discharge pipe remote from the branch pipe, in downstream direction towards the opposite side.

12. A discharge system for a combustion gas stream comprising:
    a discharge pipe having a first end connected to a discharge source and a second end for conveying gas stream to a first discharge destination;
    a branch pipe communicating with said discharge pipe for conveying gas stream to a second discharge destination;
    valve means for selectively blocking gas stream from either the first or second discharge destination;
    a pivotably disposable diverter vane member for disposition independent of said valve means disposable in said branch pipe shielded from said discharge pipe by said valve means, and further disposable at least partially within said discharge pipe for aiding in diverting said gas stream from said discharge pipe toward said second discharge destination.

13. The discharge system of claim 12 wherein said diverter vane means further comprising a vane mounted on a vane carrier said vane carrier pivotable about a diverter vane shaft.

14. The discharge system of claim 13 wherein said valve means comprises a diverter valve located in said discharge pipe for selectively closing either said branch pipe or said discharge pipe downstream of said branch pipe by pivotable movement of said valve means about a valve shaft.

15. The discharge system of claim 14 wherein said vane is separately pivotable from said valve shaft.

16. The discharge system of claim 15 wherein said diverter vane means further comprises a plurality of vanes and said diverter valve is inclined relative to the longitudinal axis of said discharge pipe when closing said discharge pipe to assist in directing the flow of gas towards said second discharge destination.

17. The discharge system of claim 16 wherein said discharge source further comprises a gas turbine.

18. A discharge system for a combustion gas stream comprising:
    a discharge pipe having a first end communicating with a gas turbine combustion gas source and a second end;
    a diverter chamber communicating with said second end of said discharge pipe said diverter chamber having a first opening allowing combustion gas to communicate with a first discharge destination and a second opening for allowing combustion gas to communicate with a second discharge destination;

a diverter valve pivotably disposable in said diverter chamber for selectively restricting said first or said second opening;

pivotable multivane diverter means displaced from said diverter valve deployable independently from said diverter valve in said diverter chamber from a position shielded from said combustion gas by said diverter valve to a position for assisting in the redirection of said combustion gas stream towards said second opening.

19. The discharge system of claim 18 wherein first discharge destination comprises a heat exchanger and said multivane diverter means is pivotably disposable upstream of a centerline of said second opening.

* * * * *

UNITED STATES PATENT AND TRADEMARK OFFICE
CERTIFICATE OF CORRECTION

PATENT NO. : 5,503,221
DATED : April 2, 1996
INVENTOR(S) : Philip R. Koudijs

It is certified that error appears in the above-indentified patent and that said Letters Patent is hereby corrected as shown below:

Column 3, line 56, after "according" insert -- to--.

Column 4, line 5, "3" should be -- 5 --.

Signed and Sealed this

Sixth Day of August, 1996

Attest:

BRUCE LEHMAN

*Attesting Officer*       *Commissioner of Patents and Trademarks*